United States Patent [19]

Ford

[11] 4,130,096
[45] Dec. 19, 1978

[54] IGNITION SYSTEMS FOR INTERNAL COMBUSTION ENGINES

[75] Inventor: Eric H. Ford, London, England

[73] Assignee: Lumenition Limited, England

[21] Appl. No.: 839,810

[22] Filed: Oct. 6, 1977

Related U.S. Application Data

[62] Division of Ser. No. 572,889, Apr. 30, 1975, abandoned.

[51] Int. Cl.² ............................ F02P 5/04; F02P 1/00
[52] U.S. Cl. ........................... 123/117 R; 123/117 D; 123/148 E
[58] Field of Search ............ 123/117 R, 117 D, 148 E

[56] References Cited

U.S. PATENT DOCUMENTS

| 3,875,912 | 4/1975 | Ballo | 123/148 E |
|---|---|---|---|
| 3,896,776 | 7/1975 | Ford | 123/117 R |
| 3,921,610 | 11/1975 | Hartig | 123/148 E |
| 3,923,022 | 12/1975 | Scholl | 123/117 D |
| 3,946,709 | 3/1976 | Monpetit | 123/117 D |
| 3,955,723 | 5/1976 | Richards | 123/117 D |
| 3,957,023 | 5/1976 | Peterson | 123/148 E |
| 3,981,282 | 9/1976 | Ford | 123/117 R |
| 3,989,024 | 11/1976 | Lai et al. | 123/148 E |
| 3,996,911 | 12/1976 | Canup | 123/117 D |

FOREIGN PATENT DOCUMENTS

2302160  1/1973  Fed. Rep. of Germany ...... 123/117 R

Primary Examiner—Charles J. Myhre
Assistant Examiner—Raymond A. Nelli
Attorney, Agent, or Firm—Larson, Taylor & Hinds

[57] ABSTRACT

A closed loop electronic ignition system for internal combustion engines, in which a comparison is made between a signal derived from a fixed predetermined crank-shaft angle, and a signal derived from the commencement of the second stage of combustion within a cylinder of the engine, and if non-coincidence is detected between the two signals, the ignition timing is either advanced or retarded so as to maintain coincidence between the signals, so that the second stage of combustion always occurs at the fixed predetermined crank angle, the spark then being extinguished by switching the ignition coil "on" at this predetermined crank-shaft angle, irrespective of engine requirements.

8 Claims, 6 Drawing Figures

IGNITION SYSTEMS FOR INTERNAL COMBUSTION ENGINES

RELATED APPLICATION

This application relating to closed loop ignition systems for internal combustion engines has been divided out of application Ser. No. 572,889 now abandoned filed Apr. 30, 1975, and relating to closed loop ignition systems incorporating a double opto-electronic trigger which generates two series of bistable square wave voltages in synchronism with the engine, the frequency of one series being greatly in excess of the other series of voltage pulses.

FIELD OF THE INVENTION

The present invention relates to ignition systems for internal combustion engines, and in particular a closed loop arrangement for controlling the timing of the switching on and off of the spark by electro-mechanical means.

DESCRIPTION OF THE PRIOR ART

A known type of ignition system for an internal combustion engine employs contact breaker points operated by a cam driven via suitable gearing from the engine crank-shaft. In this system the contacts are closed and thus the battery is connected across the ignition coil for a fixed number of degrees of crank-shaft rotation irrespective of engine speed. The duration of the spark, which commences when the contact breaker points are opened, is a function of the electrical parameters of the system, and is substantially independent of engine speed.

Another known type of ignition system for internal combustion engines employs a magnetic trigger to switch off the current to the ignition coil, so initiating a spark, the current being switched on again a suitable time before another spark is required. The period of time between switch off of the ignition coil, and switch on of the ignition coil is related by suitable control means to the speed of the engine such that the coil has sufficient "on" time for its magnetic field to accumulate sufficient energy to produce the spark.

A further known type of ignition system is triggered by opto-electronic means at appropriate crank-shaft positions, the triggering switching off the current to the ignition coil, the coil being reconnected to the battery a fixed period after switch off. In such a system the crank-shaft position at which a spark is initiated is precisely defined. The spark duration depends on the electrical parameters of the system, switch on of the coil being a fixed time after switch off rather than a particular number of crank-shaft degrees later. This system is effectively monostable, since the spark is produced by an electronic circuit which has a stable state in which the coil is "on" and is triggered to the unstable state to interrupt the current in the primary winding, and thus initiates the necessary secondary voltage to produce the spark, the circuit returning to the stable state a fixed time thereafter.

A known improvement upon the above monostable opto-electronically controlled system is a bistable system as disclosed in my U.S. Pat. Nos. 3,605,712 and 3,710,131 whereby the crank-shaft angles between the switch on and off of the coil are fixed.

In my U.S. Pat. No. 3,896,776 I have disclosed an ignition system for an internal combustion engine in which not only the timing of the spark is controlled in accordance with engine requirements, but the duration of the spark is controlled relative to the angular position of the crank-shaft such that the spark at the spark plug is extinguished at a predetermined crank-shaft angle irrespective of the crank-shaft angle at which the spark is initiated. In the preferred embodiment disclosed, this position is in the range of from 0° to 5° after top dead center (A.T.D.C).

The system disclosed in my U.S. Pat. No. 3,896,776 utilizes the basic principle disclosed in my U.S. Pat. No. 3,981,282 concerning the automatic computerized advance and retard of spark ignition. In this latter Patent, the advance and retard of the spark ignition of an internal combustion engine is achieved electronically by generating two series of pulses in synchronism with the engine, using one series as a reference for maximum advance and "coil on," and the other series to operate a counter to count down the requisite number of pulses beyond the maximum advance point before the spark is initiated, the count of the counter being varied from a computer in accordance with speed and/or load on the engine.

In addition to the speed and/or load of the engine there are a number of other factors which to a greater or less extent affect the spark timing of an internal combustion engine.

The principal factors are: fuel octane rating, air temperature, humidity and air pressure.

It has been general practice to establish advance curve requirements for both speed and load changes on the particular engine concerned by dynometer testing using simulated conditions in the laboratory. Having obtained the advance curves for speed and load, mechanical means are constructed in order to reproduce these curves representing the required timing of the ignition by means of physical movement of the ignition system components relative to the engine's crank position, i.e. top dead center (T.D.C).

It has further been proposed to use mechanical means to achieve advance or retard of the ignition timing, which takes into account the other factors noted above, such as fuel octane rating, air temperature, humidity and air pressure. Such systems are, of course, mechanically complicated and are liable to error and failure.

Studies of the combustion process within an internal combustion engine have shown that the combustion process has two distinct stages. Firstly, after the initiation of the spark, there is a low pressure stage wherein the mixture is igniting and a flame is starting to propagate within the combustion chamber. At some subsequent point in time a sudden rise in both the pressure and temperature within the cylinder is observed, which marks the commencement of the second explosive stage of combustion. During the initial hereinafter referred to as "the commencement of the second stage of combustion" stage of combustion temperatures and pressures within the combustion chamber are low compared with the temperatures, and pressures within the combustion chamber during the second stage of combustion.

By the commencement of the second stage of combustion the mixture in the cylinder is well alight, and the presence of any spark at the spark plug is irrelevant to the following process of combustion within the cylinder. It is the timing of the commencement of this second stage which is extremely important. Tests have shown that for best engine efficiency this sudden pressure and temperature rise should always occur at one fixed crank-shaft angle, regardless of all the variables which influence the spark timing requirement.

SUMMARY OF THE INVENTION

It is therefore an object of the present invention to provide a closed loop ignition system in which a predetermined pressure on the pressure rise curve occurring during the second stage of combustion can be accurately sensed in relation to a given fixed angular position, and maintained at this position under all engine conditions.

According to the present invention there is provided an electronic ignition system including: means for generating a series of square wave voltage pulses whose mark space ratio is variable, one edge of said waveform always occurring at a fixed predetermined crank-shaft position, whilst the other edge is variable for the purpose of advancing or retarding the ignition; means for varying the mark space ratio of the generated square wave voltage pulses in response to engine requirements; means for deriving a signal from the second stage of combustion representative of a selected point on the pressure rise curve; means operative from a timing comparison between the occurrence of said derived signal and said fixed edge of the square voltage pulses to vary the mark space ratio of said voltage pulses and hence the ignition timing so maintaining coincidence between said derived signal and the fixed edge of the square wave voltage pulses.

BRIEF DESCRIPTION OF THE DRAWINGS

The present invention will now be described in greater detail by way of example, with reference to the accompanying drawings, wherein.

DESCRIPTION OF ONE EMBODIMENT OF THE RELATED APPLICATION

The ignition control system disclosed in application Ser. No. 572,889, from which this application has been divided will be described with reference to FIGS. 1 to 3 in so far as it is relevant to the understanding of the present invention.

Figure 1:
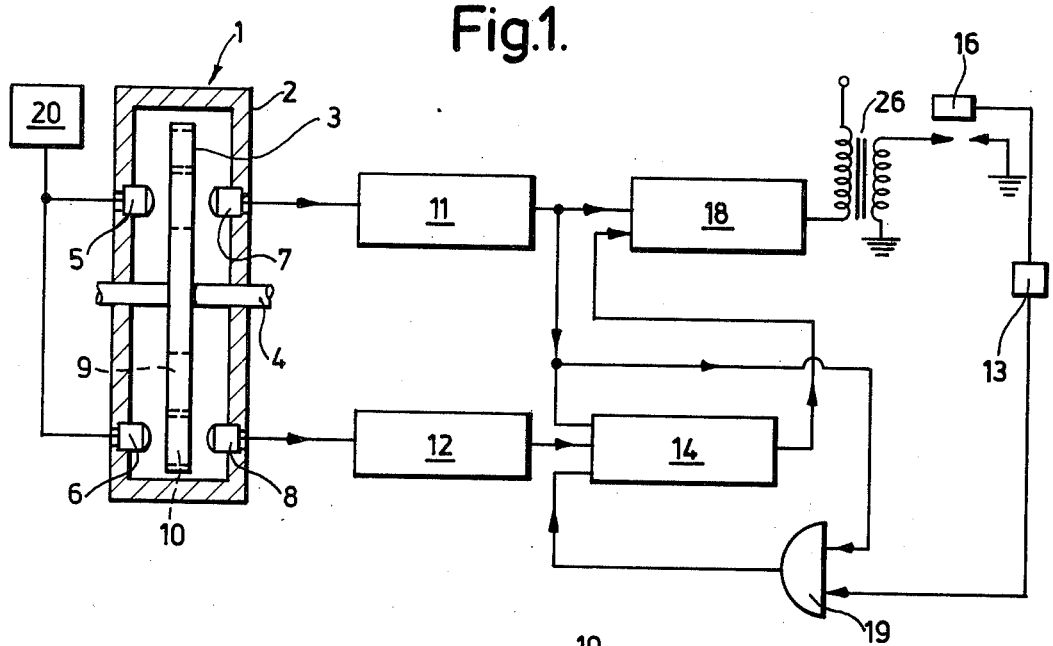
FIG. 1 is a diagram (partly in block form) of one form of spark control device for use with a spark ignition system of an internal combustion engine, which is the subject of the related application Ser. No. 572,889.
Figure 2:
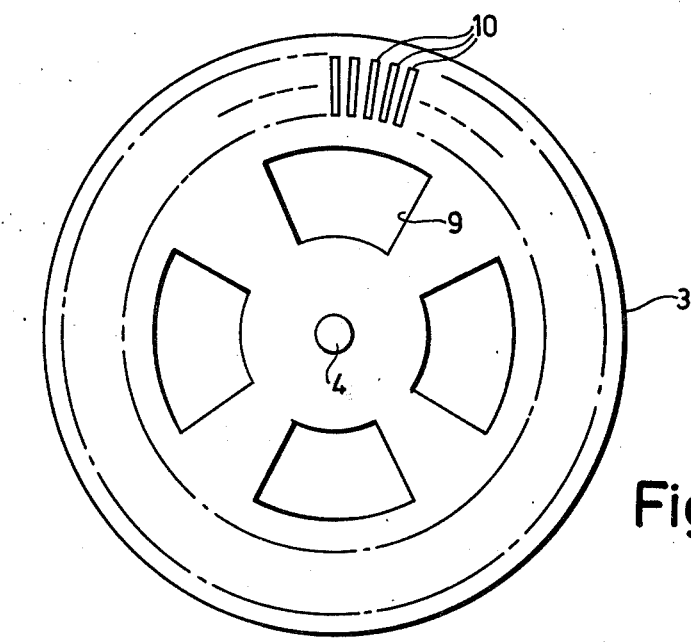
FIG. 2 is a front view of the disc shown in FIG. 1.

Referring to FIGS. 1 and 2, the device achieves electronic control of the advance and retard of the initiation of the spark through the detection of the crank-shaft position of the commencement of the second stage of the combustion within the cylinders. The device includes a radiation chopper device generally designated 1; a first fast inverse switching trigger circuit 11; a second fast inverse switching trigger circuit 12; a counter 14; a pressure detector stage 16; an AND gate 19; and a power transistor stage 18.

Circuit details of the two inverse fast switching triggers 11 and 12 and the power transistors stage 18 have been disclosed in my U.S. Pat. No. 3,981,282.

The radiation chopper device 1 consists of a housing 2; a disc 3; a shaft 4 carrying the disc 3; infra-red radiation sources 5 and 6; and radiation detectors 7 and 8. The infra-red radiation sources 5 and 6 are preferably gallium arsenide lamps, and the radiation detectors are preferably photo-transistors, all these elements being fixed to the housing 2. The shaft 4 is journalled in bearings (not shown) in the housing 2, and is driven at cam shaft speed of the engine.

The chopper disc 3 comprises two series of concentric apertures 9 and 10. There are four apertures 9 in equi-spaced relation, and a large number of small apertures or slits 10 (e.g. 68). The apertures 9 permit infra-red radiation from the lamp 5 to reach the photo-transistor 7, and the slits 10 permit infra-red radiation from the lamp 6 to reach the photo-transistor 8. The lamps 5 and 6 are energized through a common stabilized voltage source 20.

The output from the respective photo-transistors 7 and 8 is fed to the inputs of respective fast inverse switching triggers 11 and 12. The output from the first trigger 11 is applied firstly to the power transistor stage 18, and secondly to a first input of the AND gate 19. The output of the second trigger 12 is fed to the counter 14, which normally gives a "0" output, but which on completion of the count down set therein through the operation of the AND gate 17 gives a "1" output. The pressure detector stage 16 is preferably a piezo-electric detector, and is designed to give an output when the pressure exceeds a predetermined value. The piezo-electric detector is housed either in the wall of the cylinder above the piston when location at T.D.C, or in the upper cylinder head on the opposite sides from the spark plug. The output from the piezo-electric detector is applied to a third trigger 13, which squares the output pulses and applies it to a second input of the AND gate 19. The AND gate 19 detects whether or not there is a simultaneous coincidence of "1" on both its inputs and in the event there is coincidence, it provides an output to adjust the count of the counter 14 by one step at a time to advance the ignition by a few degrees, in order to ensure that the pressure peak occurs at a predetermined crank-shaft angle, which is preferably 10° A.T.D.C. The power transistor stage 18 controls the current flow through the primary winding of the ignition coil 26. When the outputs from the stages 11 and 14 are either "0" and "1" or "1" and "0" or "0" and "0" current flows through the primary winding of the ignition coil 26, but when both outputs are at the high level "1," then the current through the coil is interrupted, producing the collapse of the magnetic field and the resultant high secondary voltage necessary for the spark.

Figure 3:
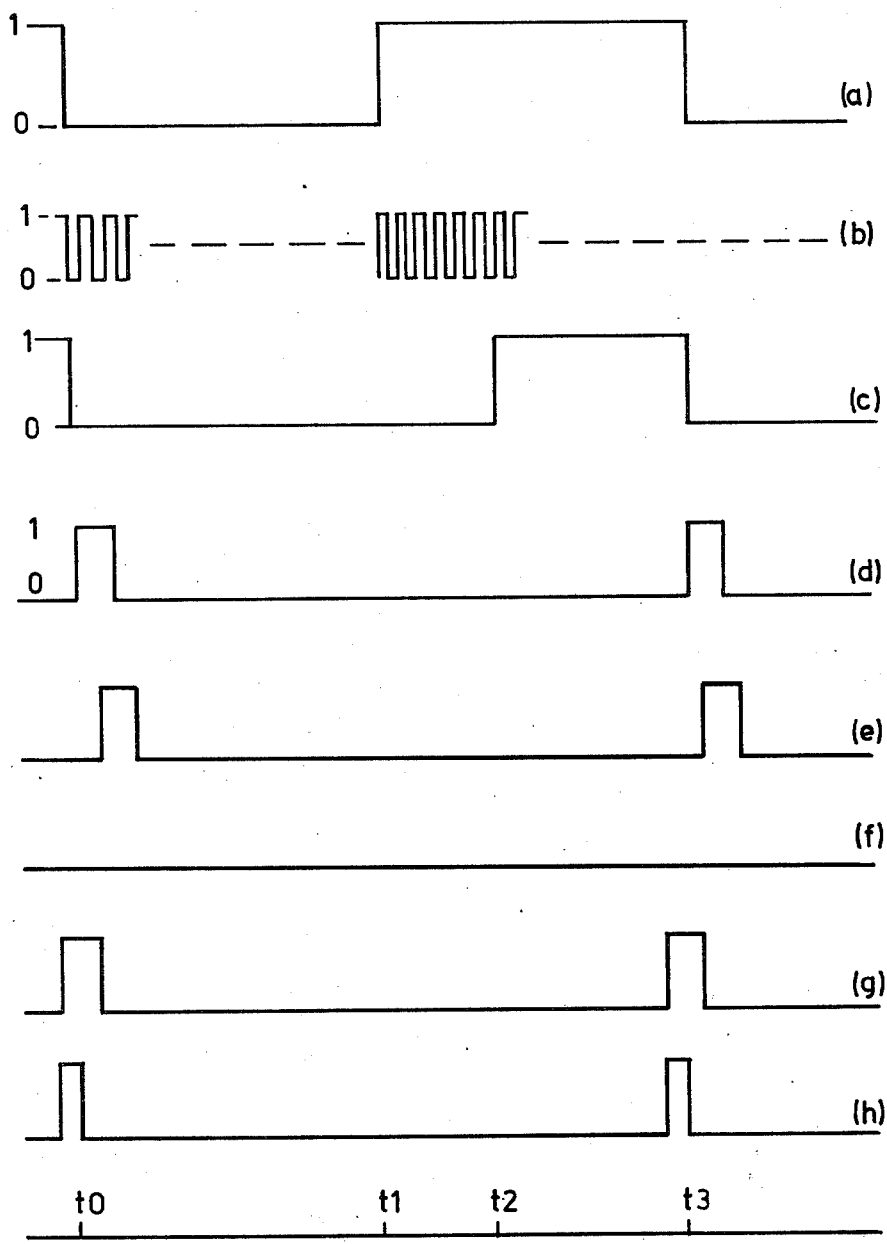
FIG. 3 is a set of waveforms which assist in explaining the operation of the circuit shown in FIG. 1.

The operation of the electronic spark control device will now be described in greater detail with the aid of the waveforms shown in FIG. 3. As the disc 3 is rotated at crank-shaft speed of the engine, the infra-red radiation from the lamps 5 and 6 impinges on the respective photo-transistors 7 and 8 through the apertures 9 and slits 10. Accordingly, the photo-transistor 7 produces four current pulses per revolution of the disc 3, whilst the photo-transistor 8 produces a large number (e.g. 68) of pulses per revolution. The two triggers 11 and 12 fast switch and amplify these pulses to produce the waveforms (a) and (b) respectively. During the interval between crank-shaft positions t0 and t1 the photo-transistor 7 is energized by infra-red radiation, and is therefore conductive. The output from the first trigger is at the low level representing a "0." At the position t1, the infra-red radiation is cut off and the output of the first trigger becomes high representing a "1." This output is applied to both the counter 14 and the first transistor of the power transistor stage 18. The counter 14 now counts the pulses from the second trigger 12 according to the number set therein. The output of the counter 14 is at the low level "0" from crank-shaft position t0 up to and beyond the crank-shaft position t1. Therefore, when the trigger 11 produces a high level output, the power transistor stage is not switched because of the continued presence of a low level output from the counter 14. In the example illustrated, the counter 14 is set to count down a total of six pulses before its output switches to the high level. Therefore, at crank-shaft position t2, when the count of six has been completed, the output becomes high at the seventh pulse, and the power transistor stage switches off the flow of current in the primary winding of the ignition coil 26, and thus initiates the spark through the high induced secondary voltage on the collapse of the field in the primary winding of the coil. At crank-shaft position t3 which is the idealized crank-shaft position at which the commencement of the second stage of the combustion should occur, the output of the first trigger reverts to the low level, thus extinguishing the spark, and resetting the counter 14, which also reverts to the low level, as shown by waveform (c), these events both happening when the photo-transistor 7 is again energized by infra-red radiation.

Waveform (d) shows the "1" output from the third trigger 13 when the combustion within the cylinder has reached its second stage, and has been detected by the piezo-electric detector 16.

The circuit is designed to operate about the ideal position when the leading edge of the waveform (d) coincides with the crank-shaft position t3, this leading edge representing the commencement of the second stage of combustion. If, as shown in waveform (e), the leading edge of the pulse from the trigger 13 occurs after the position t3, the AND gate 19 does not detect any coincidence between the "1" outputs from the first trigger 11 and the third trigger 13, as shown in waveform (f). Under these conditions the count of the counter 14 is reached by one step at a time until coincidence is detected. If, on the other hand, as shown in waveform (g), the leading edge of the pulse from the trigger 13 occurs before the crank-shaft position t3, the AND gate detects coincidence as shown in its output waveform (h). Under these conditions the count of the counter 14 is increased by one step at a time until coincidence is no longer detected. Thus, under normal running conditions, the count of the counter is adjusted by increments so as to maintain the leading edge of the waveform (d) at the crank-shaft position of t3.

DESCRIPTION OF THE PREFERRED EMBODIMENT

Figure 4:
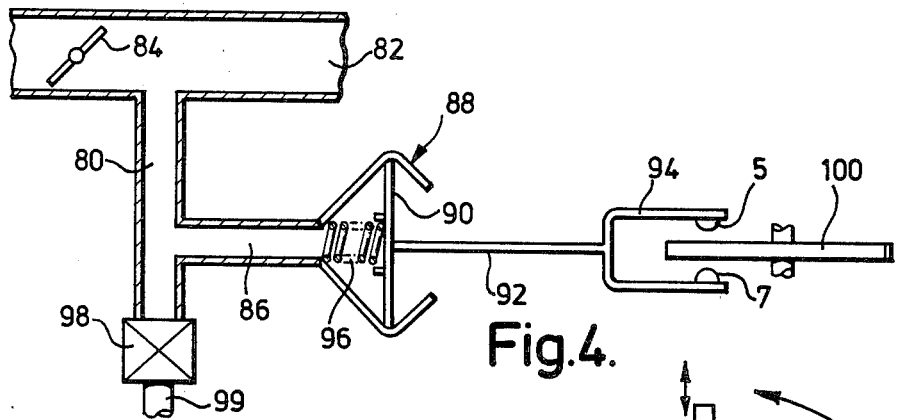
FIG. 4 is a part cross sectional view through the inlet manifold of the engine, showing one preferred form of a closed loop ignition system utilizing the vacuum in the inlet manifold.

In the above embodiment of the related application, use has been made of the second trigger 12 and counter 14 in conjunction with the first trigger 11 and electro-mechanical transducer to determine the coil off position, i.e. the production of the spark such that the commencement of the second stage of combustion occurs at the precise crank-shaft position at which the coil switches on to extinguish the spark. Instead of determining the required advance and retard electronically, it may be achieved by electro-mechanical means. In the preferred form shown in FIGS. 4 to 6, the second trigger and counter are omitted. This alternative method of carrying out the invention is contrast to the embodiments of the related application Ser. No. 572,889 utilizes the vacuum manifold of the engine. As shown in FIG. 4, a pipe 80 is connected to the engine inlet manifold of the carburettor 82 upstream of a throttle valve 84. The pipe 80 has a branch 86 connected to a chamber 88. The chamber 88 is provided with a diaphragm 90, to which is connected a rod 92 carrying a forked portion 94. The ends of the forked portion 94 carry the infra-red radiation source 5 and the detector 7 associated with the first trigger 11. A spring 96 is provided within the chamber 88 to urge the diaphragm 90 to its neutral position against the partial vacuum produced in the chamber 88. A solenoid valve 98 is provided to bleed air from the atmosphere into the chamber 88 from a pipe 99.

Figure 5:
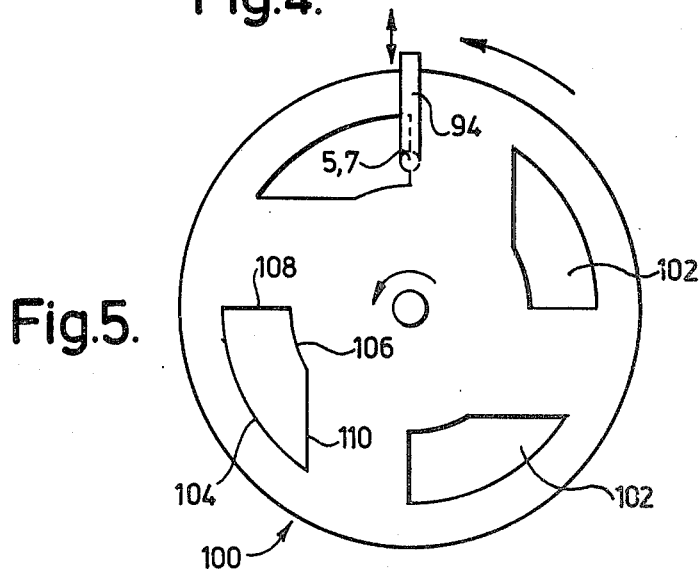
FIG. 5 is a view of the chopper disc for the system shown in FIG. 4.

An apertured disc 100 is rotated in synchronism with the crank-shaft of the engine, and is positioned as shown in FIGS. 4 and 5 between the infra-red source 5 and detector 7. The disc 100 has four identical apertures 102 equi-spaced around the circumference of the disc. Each aperture 102 has arcuate outer and inner peripheries 104 and 106 respectively, a radial aligned edge 108 and a straight radially inclined edge 110. The radial edge 108 provides a constant coil "on" position to extinguish the spark and the radially inclined edge 110 provides the necessary advance and retard of the production of the spark (the coil "off" position) according to the distance of the infra-red source 5 and detector 7 from the centre of the disc 100. The output square waveform generated by the first trigger thus has a variable mark space ratio which is a function of the distance of the elements 5 and 7 from the centre of the disc.

Figure 6:
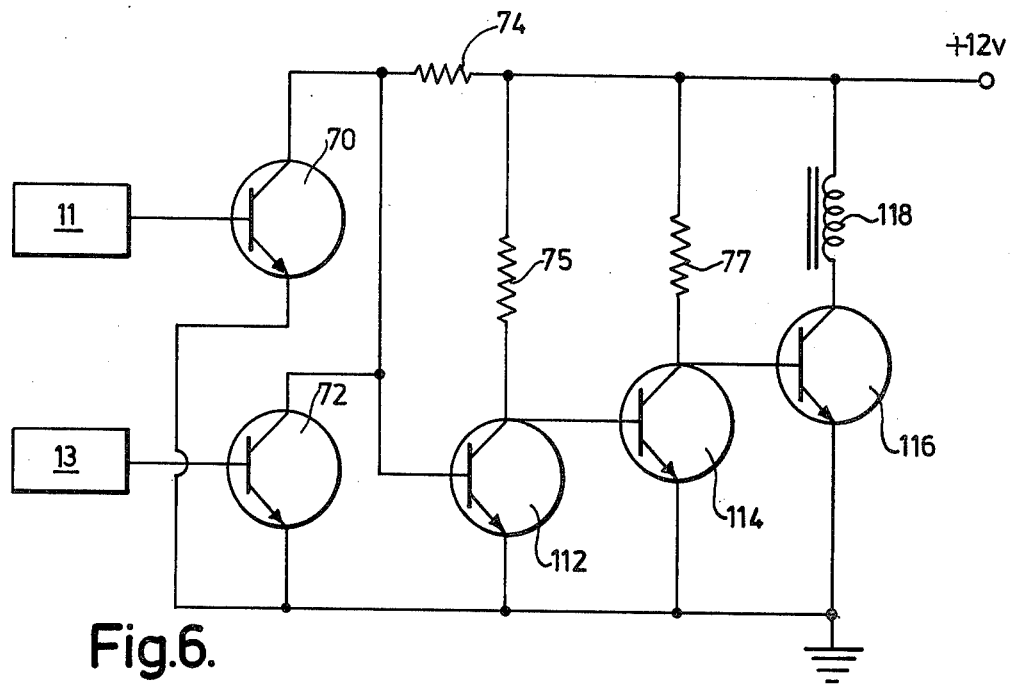
FIG. 6 is a circuit diagram of the circuit which energizes the solenoid shown in FIG. 4 from the outputs of the two triggers.

Referring now to FIG. 6, the logical outputs from the first trigger 11 and the third trigger 13 are applied to respective transistors 70 and 72 having a common collector resistor 74 and are thus combined. The combined signal is applied to the base electrode of a transistor 112, which forms the first stage of a fast inverse switching trigger circuit comprising transistors 112, 114 and 116, the last transistor 116 being in series with the energizing coil 118 of the solenoid valve 98. The transistors 112 and 114 are each provided with respective collector resistors 75 and 77.

The above described embodiment operates as follows. The system is designed so that the vacuum of the inlet manifold of the engine pulls the diaphragm 90 against the action of the spring, so as to move the line of sight of the elements 5 and 7 radially outwards with respect to the disc 100, thus tending to increase the mark-space ratio of the output of the first trigger in order to over advance the ignition timing. When the timing becomes over-advanced, i.e. the leading edge of the waveform (d) is occurring before the crank-shaft position of t3, coincidence is detected at the combined output of the transistors 70 and 72. This causes the transistor 112 to conduct, the transistor 114 to become non-conductive, and the transistor 116 to be conductive. When the transistor 116 becomes conductive, the solenoid 98 is energized to bleed in air into the chamber 88. This causes the diaphragm to relax slightly, and to move the line of sight of the elements 5 and 7 radially inwards, towards the centre of the disc 100, so as to effect a retard of the ignition timing. As soon as coincidence at the combined output of the transistors 70 and 72 ceases, the circuit of the transistors 112 to 116 reverts to its other stable state to de-energize the solenoid 98. The system thus hunts about the point where the leading edge of the waveform (d) is maintained at the crank-shaft position t3.

What I claim and desire to secure by Letters Patent is:

1. An electronic ignition system including: means for generating a series of square wave voltage pulses whose mark space ratio is variable, one edge of said waveform always occurring at a fixed predetermined crank-shaft position, whilst the other edge is variable for the purpose of advancing or retarding the ignition; means for varying the mark space ratio of the generated square wave voltage pulses in response to engine requirements; means for deriving a signal from the second stage of combustion representative of a selected point on the pressure rise curve; means operative from a timing comparison between the occurrence of said derived signal and said fixed edge of the square voltage pulses to vary the mark space ratio of said voltage pulses and hence the ignition timing so maintaining coincidence between said derived signal and the fixed edge of the square wave voltage pulses.

2. An electronic ignition system according to claim 1, wherein the means for varying the mark-space ratio include an apertured disc driven in synchronism with the crank-shaft of the engine, said apertures being equi-spaced around the disc, an infra-red radiation source and a detector mounted on either side of the disc for movement relative thereto, a first operative edge of each aperture being aligned in the direction of movement of said radiation source and detector, whilst a second operative edge is inclined relative thereto in order to achieve said advance or retard of the ignition timing, and mechanical means for moving said radiation source and detector in accordance with engine requirements.

3. An electronic ignition system according to claim 2, wherein said mechanical means includes a diaphragm actuated from the partial vacuum in the inlet manifold of the engine against the action of a spring, said diaphragm being coupled to said radiation source and detector for movement thereof relative to the disc, and a solenoid actuated from the result of said timing comparison for bleeding in air to partially relax said diaphragm against the pull of the partial vacuum.

4. An electronic ignition system according to claim 1, wherein the means for deriving a signal from the second stage of combustion is an electro-mechanical transducer device which is located in the wall of the cylinder, above the level of the top of the piston at top dead centre.

5. An electronic ignition system according to claim 4, wherein said electro-mechanical transducer device is a piezo-electric detector.

6. An electronic ignition system according to claim 2, wherein said first operative edge of each aperture is radial with respect to the centre of the disc, whilst the second operative edge is inclined to the radial direction of the disc, the infra-red radiation source and detector being coupled to said mechanical means so as to be movable in a radial direction with respect to the centre of the disc.

7. An electronic ignition system according to claim 2, wherein said mechanical means includes an engine vacuum device coupled to said radiation source and detector, the movement of said engine vacuum device being controlled by a solenoid which on operation from the result of the timing comparison bleeds in air to maintain the desired timing position.

8. An electronic ignition system according to claim 1, wherein the signal derived from the second stage of combustion is a digital signal which is fed to the same input of an electronic device controlling said operative means as the said square wave voltage pulses, thereby performing said timing comparison digitally.

* * * * *